US012098568B2

(12) United States Patent
Johnson et al.

(10) Patent No.: US 12,098,568 B2
(45) Date of Patent: Sep. 24, 2024

(54) CABLE BARRIER SEPARATOR APPARATUS

(71) Applicant: DSE Enterprise Inc, Miltona, MN (US)

(72) Inventors: Scott A. Johnson, Miltona, MN (US); Dustin S. Johnson, Alexandria, MN (US)

(73) Assignee: DSE Enterprise Inc, Miltona, MN (US)

( * ) Notice: Subject to any disclaimer, the term of this patent is extended or adjusted under 35 U.S.C. 154(b) by 0 days.

(21) Appl. No.: 18/482,131

(22) Filed: Oct. 6, 2023

(65) Prior Publication Data

US 2024/0151063 A1 May 9, 2024

Related U.S. Application Data

(60) Continuation of application No. 17/301,589, filed on Apr. 8, 2021, now Pat. No. 11,814,863, which is a division of application No. 15/941,564, filed on Mar. 30, 2018, now Pat. No. 10,995,520.

(51) Int. Cl.
*E04H 17/26* (2006.01)
*B25B 25/00* (2006.01)

(52) U.S. Cl.
CPC ............ *E04H 17/266* (2013.01); *B25B 25/00* (2013.01)

(58) Field of Classification Search
CPC ......... B21D 7/06; E04H 17/06; E04H 17/261; E04H 17/266; E04H 17/268; Y10T 29/53683; Y10T 29/53861; Y10T 29/53865; B25B 5/00; B25B 5/122; B25B 5/14; B25B 25/00; B23Q 1/25; B23Q 1/28; B23P 11/00; B23P 19/04
USPC .................. 269/32, 24, 26, 27; 29/255, 244; 294/132; 254/231
See application file for complete search history.

(56) References Cited

U.S. PATENT DOCUMENTS

| | | | | |
|---|---|---|---|---|
| 1,957,367 | A | 5/1934 | Henry | |
| 2,344,052 | A * | 3/1944 | Neale | H02G 1/02 254/231 |
| 3,360,138 | A | 12/1967 | Hunter et al. | |
| 5,201,501 | A | 4/1993 | Fassler | |
| 5,233,740 | A | 8/1993 | Chen | |
| 5,419,027 | A | 5/1995 | McPeak et al. | |
| 5,896,639 | A | 4/1999 | Chen | |
| 8,146,221 | B2 | 4/2012 | Hung | |
| 8,820,716 | B1 | 9/2014 | Silver | |
| 2008/0011995 | A1 | 1/2008 | Ross et al. | |

* cited by examiner

*Primary Examiner* — Abbie E Quann
(74) *Attorney, Agent, or Firm* — Thompson Patent Law Offices PC

(57) ABSTRACT

A cable barrier separator apparatus for separating cables from the barrier support so that the barrier support can be replaced. The cable barrier separator apparatus includes an actuator assembly; and an engagement assembly in communication with the actuator assembly for separating cables from support devices.

21 Claims, 3 Drawing Sheets

CABLE BARRIER SEPARATOR APPARATUS

CROSS-REFERENCE TO RELATED APPLICATIONS

This application is a continuation of U.S. application Ser. No. 17/301,589, titled "CABLE BARRIER SEPARATOR APPARATUS" filed by Scott Johnson, et al., on Apr. 8, 2021, which is a divisional of and claims the benefit of U.S. application Ser. No. 15/941,564, titled "CABLE BARRIER SEPARATOR APPARATUS," filed by Scott Johnson, et al., on Mar. 30, 2018.

This application incorporates the entire contents of the foregoing application(s) herein by reference.

BACKGROUND OF THE INVENTION

Field of the Invention

The present invention relates to spreading tools and more particularly pertains to a new cable barrier separator apparatus for separating cables from the barrier support so that the barrier support can be replaced.

Description of the Prior Art

The use of spreading tools is known in the prior art. More specifically, spreading tools heretofore devised and utilized are known to consist basically of familiar, expected and obvious structural configurations, notwithstanding the myriad of designs encompassed by the crowded prior art which have been developed for the fulfillment of countless objectives and requirements.

The prior art describes a device interposed between the wire and the ground anchor. The device operates in bending. Another prior art comprises a base portion and an end plate that extends generally vertically from base portion and has an upper edge. One or more are positioned in end plate along upper edge. The cables are secured in slots. Also another prior art includes an anchor-body and terminal post which receive and retain one or more anchor-cables and are anchored to counter balance the force applied to the anchor body by one or more barrier-cables. The system also allows for the release of the anchor-cables during a collision with a vehicle. While these devices fulfill their respective, particular objectives and requirements, the aforementioned patents do not disclose a new cable barrier separator apparatus.

SUMMARY OF THE INVENTION

The general purpose of the present invention, which will be described subsequently in greater detail, is to provide a new cable barrier separator apparatus which has many of the advantages of the spreading tools mentioned heretofore and many novel features that result in a new cable barrier separator apparatus which is not anticipated, rendered obvious, suggested, or even implied by any of the prior art spreading tools, either alone or in any combination thereof. The present invention includes an actuator assembly; and an engagement assembly in communication with the actuator assembly for separating cables from support devices. None of the prior art includes the combination of the elements of the present invention.

There has thus been outlined, rather broadly, the more important features of the cable barrier separator apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various way. Also, it is to be understood that the phraseology and terminology employed herein are for the purpose of description and should not be regarded as limiting.

It is an object of the present invention to provide a new cable barrier separator apparatus which has many of the advantages of the spreading tools mentioned heretofore and many novel features that result in a new cable barrier separator apparatus which is not anticipated, rendered obvious, suggested, or even implied by any of the prior art spreading tools, either alone or in any combination thereof.

Still another object of the present invention is to provide a new cable barrier separator apparatus for separating cables from the barrier support so that the barrier support can be replaced.

Still yet another object of the present invention is to provide a new cable barrier separator apparatus that pulls cables away from the barrier support and pushes another cable in the other direction away from the barrier support.

Even still another object of the present invention is to provide a new cable barrier separator apparatus that is handheld and easy to use without the risk of injuring oneself due to the high tension of the cables relative to the barrier support being replaced.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
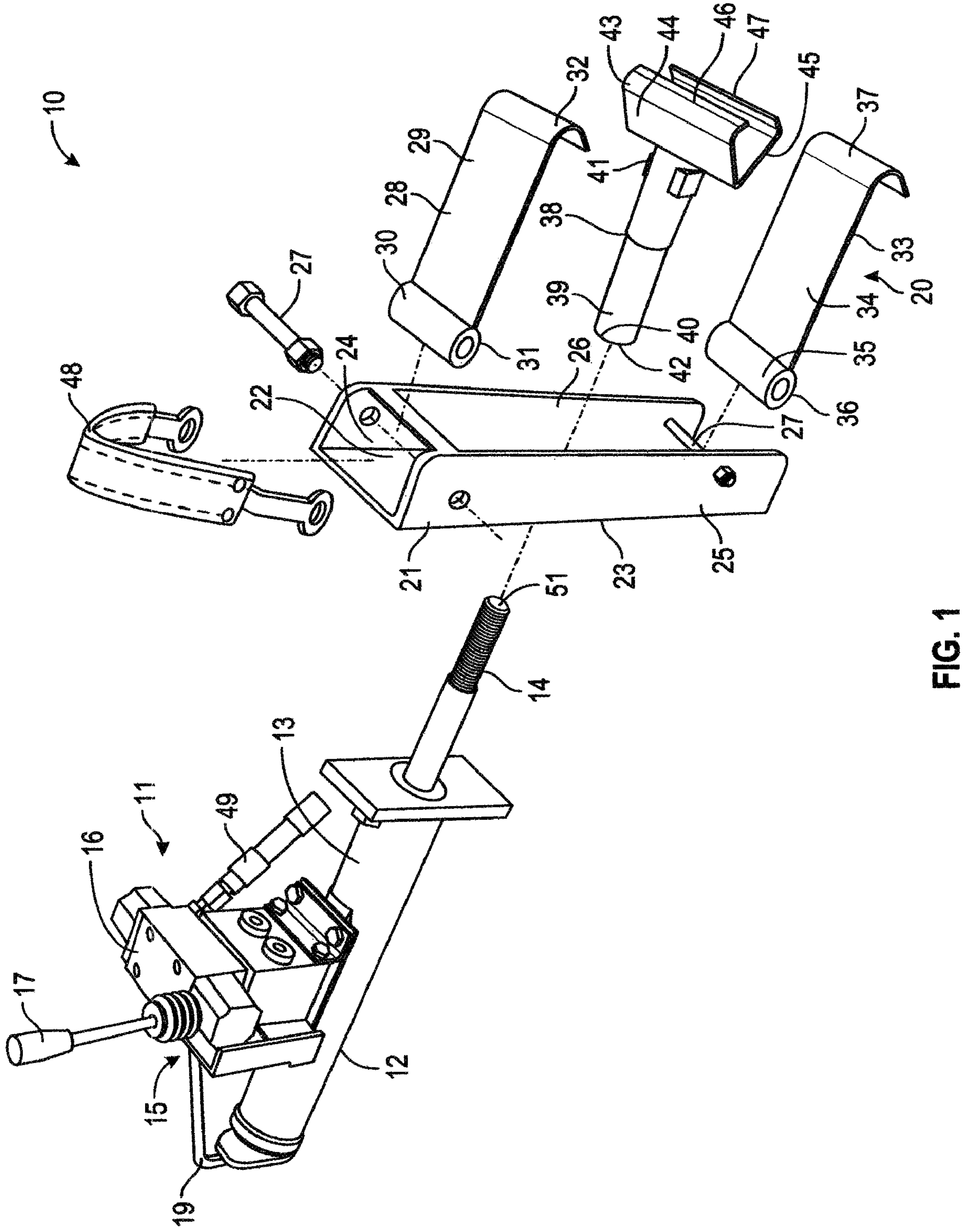
FIG. 1 is a side perspective view of a new cable barrier separator apparatus according to the present invention.
Figure 2:
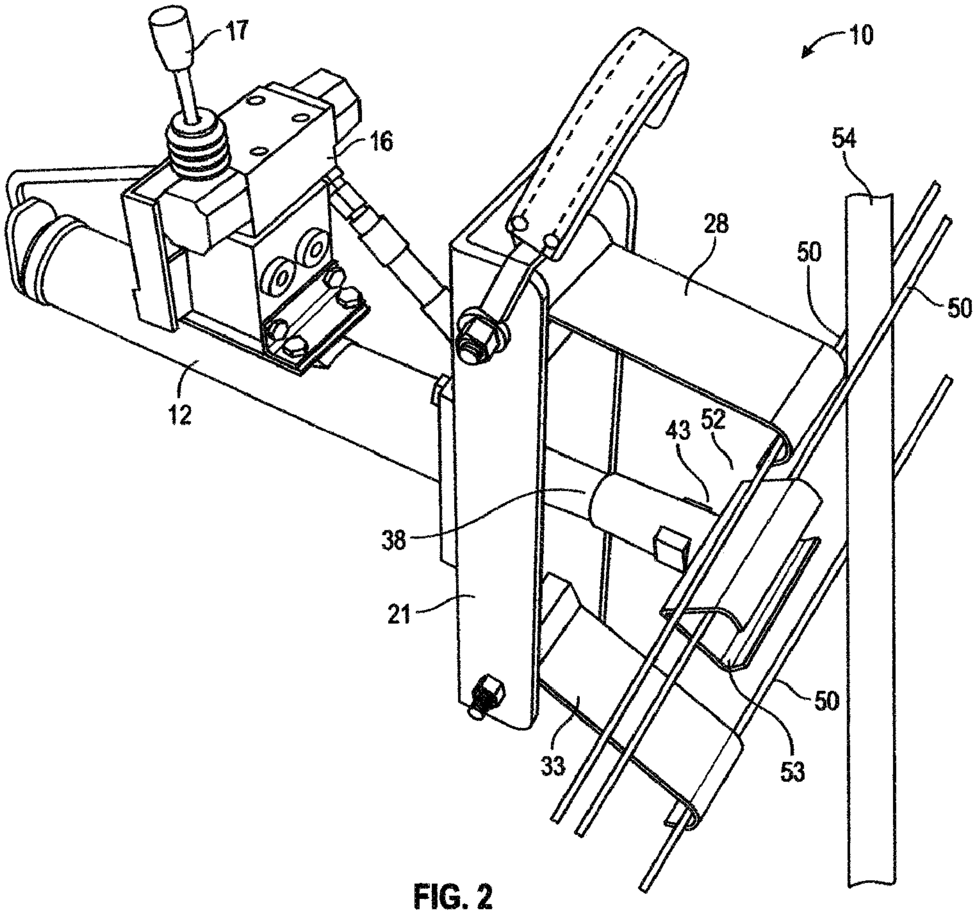
FIG. 2 is a front exploded perspective view of the present invention.
Figure 3:
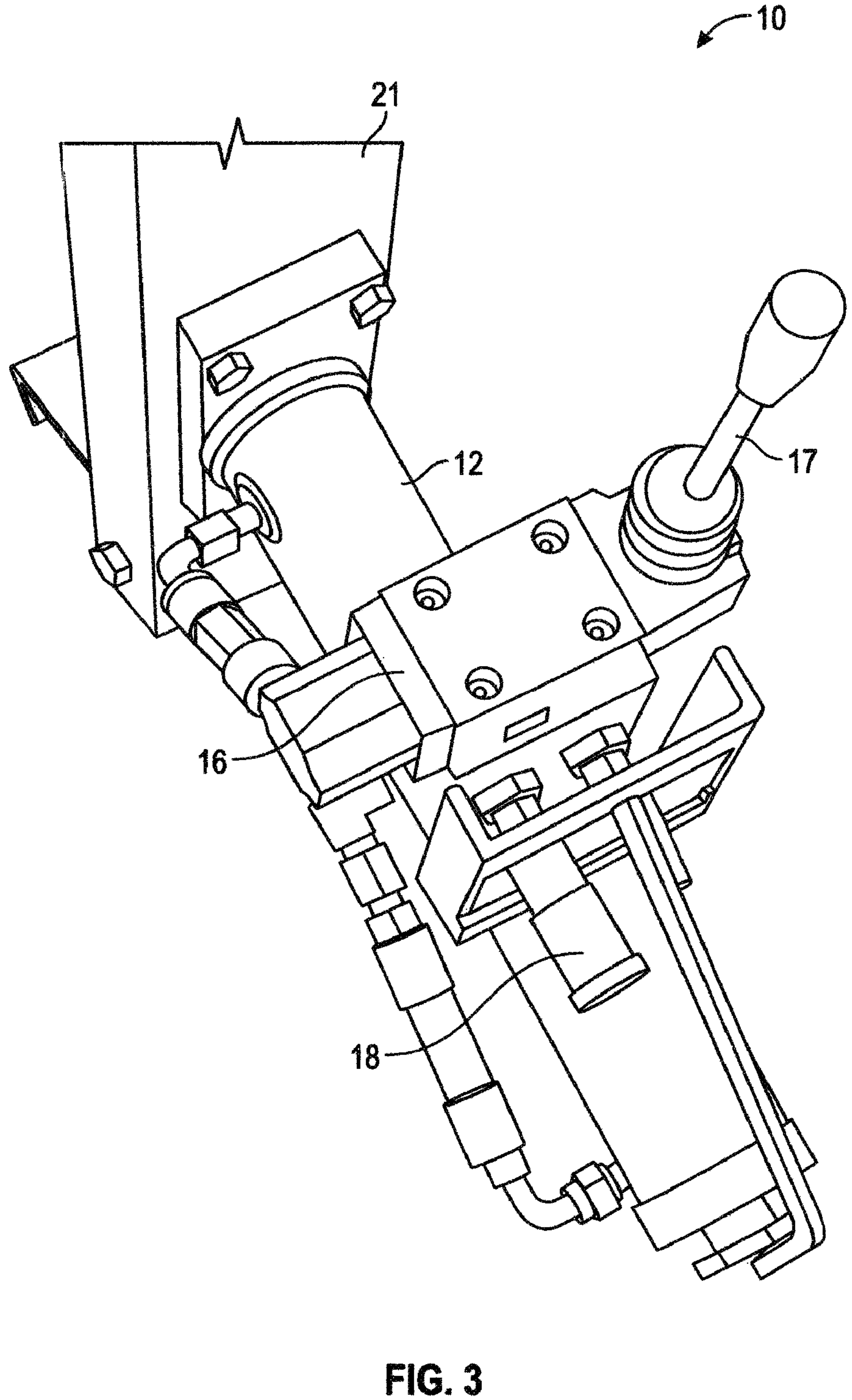
FIG. 3 is a rear perspective view of the present invention.

With reference now to the drawings, and in particular to FIGS. 1 through 3 thereof, a new cable barrier separator apparatus embodying the principles and concepts of the present invention and generally designated by the reference numeral 10 will be described.

As best illustrated in FIGS. 1 through 3, the cable barrier separator apparatus 10 generally comprises an actuator assembly 11; and an engagement assembly 20 in communication with the actuator assembly 11 for separating cables from a barrier support 54. The actuator assembly 11 includes a hydraulic cylinder 12 having a cylindrical barrel 13 and a piston 14 movable relative to the barrel 13 and also includes a control unit 15 conventionally mounted to the hydraulic cylinder 12 for actuating the piston 14. The control unit 15 includes a control module 16 and a lever 17 conventionally connected to the control module 16 for actuating the hydraulic cylinder 12. The actuator assembly 11 also includes a hose connector 18 conventionally coupled to the hydraulic cylinder 12 and in communication with the control unit 15 and adapted to be connected to a power source, and also includes a rigid handle member 19 conventionally coupled to the hydraulic cylinder 12 and the control unit 15.

The engagement assembly 20 includes a support bracket 21 conventionally mounted to the hydraulic cylinder 12 with the barrel 13 conventionally disposed through the support bracket 21 and also includes hook members 28, 33 pivotally mounted to the support bracket 21. The support bracket 21 includes a wall 22 having opposed longitudinal edges 23, 24 with wings 25, 26 conventionally disposed along the opposed longitudinal edges 23, 24 and perpendicular to the wall 22. The engagement assembly 20 also includes hook support members 27 spaced apart and disposed through the wings 25, 25. Each of the hook members 28, 33 has a main portion 29, 34, a proximate portion 30, 35 terminating in an endless loop 31, 36, and also has a distal portion 32, 37 longitudinally curved and forming a hook for engaging a respective cable 50. The hook support members 27 are disposed through the endless loops 31, 36 of the hook members 28, 33 with the hook members 28, 33 being pivotal about the hook support members 27. The engagement assembly 20 also includes a bracket member 38 conventionally mounted to an end 51 of the piston 14. The bracket member 38 includes a tubular portion 39 having a closed end 41, an open end 40 and a bore 42 disposed therein with the piston 14 securely disposed in the bore 42 through the open end 40, and also includes a cable containment portion 43 conventionally attached at the closed end 41 of the tubular portion 39. The cable containment portion 43 includes a pair of planar sections 44, 45 angled away from one another and from the tubular portion 39 forming a V-shape with the cable containment portion 43 conventionally coupled to the tubular portion 39 at a junction of the planar sections 44, 45. The cable containment portion 43 also includes end sections 46, 47 each extending from a distal end 52, 53 of and angled relative to a respective planar section 44, 45 and angled inwardly of the cable containment portion 43 with the end sections 46, 47 being spaced apart and are angled towards one another to ensure that a respective cable 50 is retained by the cable containment portion 43. The engagement assembly 20 also includes a flexible handle 48 conventionally coupled to the support bracket 21 and further includes an adjustable brace 49 conventionally coupled to the support bracket 21 and to the hydraulic cylinder 12.

In use, the cable barrier separator apparatus 10 is positioned adjacent to a barrier support 54. Cables 50 positioned to opposite sides of the barrier support 54 are engaged using the hook members 28, 33 and the bracket member 38. The hook members 28, 33 are engaged to the cables 50 positioned to one side of the barrier support and the bracket member 38 is engaged to the cable 50 to the opposite side of the barrier support 54. The hydraulic cylinder 12 is actuated to separate the cables 50 from the barrier support 54. The piston 14 and the bracket member 38 are moved away from the hook members 28, 33 separating the cables 50 from the barrier support 54.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the cable barrier separator apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cable separator apparatus comprising:
an engagement assembly comprising:
a support bracket;
a plurality of cable retaining members, each of the plurality of cable retaining members:
being pivotally mounted to the support bracket at a proximal end,
being configured to extend away from the support bracket in a first plane substantially orthogonal to the support bracket, and,
comprising a cable retaining feature at a distal end;
a bracket member disposed in the first plane between the plurality of cable retaining members, the bracket member:
being configured to be extended, by an actuator, away from the support bracket along a first axis in the first plane, and,
comprising, at a distal end of the bracket member, a cable engagement feature configured to retain a first cable in alignment across the distal end of the bracket member when the cable engagement feature is pressed against the first cable along the first axis of the bracket member during the extension of the bracket member away from the support bracket,
wherein:
the cable engagement feature comprises at least two intersecting surfaces extending away from the distal end of the bracket member, and
the pivotal mounting of each of the plurality of cable retaining members is configured such that the cable retaining feature pivots closer to and further from the bracket member;
and
an actuator system assembly comprising:
a hose connector;
a control unit in communication with the actuator of the engagement assembly;
a power source adapted to be coupled the control unit; and a handle coupled to the actuator and support bracket of the engagement assembly and in communication with the control unit.

2. The apparatus of claim 1, wherein each of the plurality of cable retaining members are configured to pivot about corresponding pivot axes oriented substantially parallel to one another.

3. The apparatus of claim 1, wherein the support bracket is provided with a wall and at least two wings extending outward from the wall in second and third planes substantially parallel to the first plane.

4. The apparatus of claim 3, wherein each of the cable retaining members is pivotally mounted to the support bracket by a corresponding support member passing through the two wings and through at least one aperture in the proximal end of the cable retaining member.

5. The apparatus of claim 1, wherein the cable retaining feature comprises a hook pivotally mounted to the support bracket.

6. The apparatus of claim 1, wherein the cable engagement feature comprises a pair of planar sections secured to the bracket member to form a V-shape at the distal end of the bracket member.

7. The apparatus of claim 1, wherein the engagement assembly is configured such that, when at least two of the plurality of cable retaining features engage corresponding cables and the cable engagement feature engages the first cable, then operation of the actuator to extend the bracket member along the first axis causes the cable retaining members to operate against the corresponding cables to displace the first cable along the first axis relative to the corresponding cables.

8. The apparatus of claim 1, wherein the power source is integral to the control unit.

9. The apparatus of claim 1, wherein the power source is removable.

10. A cable separator apparatus comprising:

an engagement assembly comprising:

a support bracket;

a plurality of cable retaining members, each of the plurality of cable retaining members:

being pivotally mounted to the support bracket at a proximal end, being configured to extend away from the support bracket in a first plane substantially orthogonal to the support bracket, and, comprising a cable retaining feature at a distal end; and, a bracket member disposed in the first plane between the plurality of cable retaining members, the bracket member:

being configured to be extended, by an actuator, away from the support bracket along a first axis in the first plane, and, comprising, at a distal end of the bracket member, a cable engagement feature configured to retain a first cable in alignment across the distal end when the cable engagement feature is pressed against the first cable along the first axis of the bracket member during the extension of the bracket member away from the support bracket, wherein the pivotal mounting of each of the plurality of cable retaining members is configured such that the cable retaining feature pivots closer to and further from the bracket member; and an actuator system assembly comprising:

a hose connector;

a control unit in communication with the actuator of the engagement assembly; and a power source adapted to be coupled the control unit.

11. The apparatus of claim 10, wherein the actuator system assembly further includes a handle coupled to the actuator of the engagement assembly and the support bracket of the engagement assembly and in communication with the control unit.

12. The apparatus of claim 10, wherein the power source is integral to the control unit.

13. The apparatus of claim 10, wherein the power source is removable.

14. The apparatus of claim 10, wherein each of the plurality of cable retaining members are configured to pivot about corresponding pivot axes oriented substantially parallel to one another.

15. The apparatus of claim 10, wherein the support bracket is provided with a wall and at least two wings extending outward from the wall in second and third planes substantially parallel to the first plane.

16. The apparatus of claim 15, wherein each of the cable retaining members is pivotally mounted to the support bracket by a corresponding support member passing through the two wings and through at least one aperture in the proximal end of the cable retaining member.

17. The apparatus of claim 1, wherein the cable retaining feature comprises a hook pivotally mounted to the support bracket.

18. The apparatus of claim 10, wherein the cable engagement feature comprises a pair of planar sections secured to the bracket member to form a V-shape at the distal end of the bracket member.

19. The apparatus of claim 10, wherein the engagement assembly is configured such that, when at least two of the plurality of cable retaining features engage corresponding cables and the cable engagement feature engages the first cable, then operation of the actuator to extend the bracket member along the first axis causes the cable retaining members to operate against the corresponding cables to displace the first cable along the first axis relative to the corresponding cables.

20. The apparatus of claim 10, the actuator comprising a hydraulic cylinder.

21. The apparatus of claim 20, wherein the hydraulic cylinder comprises a piston coupled to the bracket member such that the bracket member and hydraulic cylinder extend along the first axis.

* * * * *